United States Patent
Garcia-Franco et al.

(10) Patent No.: US 6,810,356 B1
(45) Date of Patent: Oct. 26, 2004

(54) TRAFFIC ESTIMATION

(75) Inventors: Jose Carlos Garcia-Franco, Mountain View, CA (US); Taylor Raines, Mountain View, CA (US); Michael F. Kamprath, San Francisco, CA (US); Rob Luenberger, Palo Alto, CA (US)

(73) Assignee: Advertising.com, Baltimore, MD (US)

( * ) Notice: Subject to any disclaimer, the term of this patent is extended or adjusted under 35 U.S.C. 154(b) by 16 days.

(21) Appl. No.: 10/231,026

(22) Filed: Aug. 30, 2002

(51) Int. Cl.$^7$ .............................................. G06F 15/00
(52) U.S. Cl. ....................... 702/179; 709/224; 379/133
(58) Field of Search ............................. 702/122, 179, 702/180, 181, 182, 183, 186, 187, 188; 709/224, 218, 223, 225, 226, 230, 234, 249; 370/253; 379/88.17, 265.09, 133

(56) References Cited

U.S. PATENT DOCUMENTS

| | | | |
|---|---|---|---|
| 6,411,681 B1 * | 6/2002 | Nolting et al. ............. | 379/1.01 |
| 6,560,204 B1 * | 5/2003 | Rayes ......................... | 370/253 |
| 6,721,405 B1 * | 4/2004 | Nolting et al. ............. | 379/133 |
| 2001/0054097 A1 * | 12/2001 | Chafe .......................... | 709/224 |
| 2002/0042821 A1 * | 4/2002 | Muret et al. ................ | 709/223 |

OTHER PUBLICATIONS

F. Huebner et al., Queueing Performance Comparison of Traffic Models for Internet Traffic 1998, pp. 471–476.*
K. Chandra et al., Traffic Characteristics of On–Line Services.*
Lin Zhang et al., Adaptive Virtual Topology Reconfiguration Policy Employing Multi–stage Traffic Prediction in Optical Internet. pp. 127–131.*
Mikio Hasegawa et al., Applications of nonlinear prediction methods to the Internet traffic, pp. III–169 to III–172.*
Sane Solutions, LLC, disclose NetTracker 6.0 Professional User's Guide. (Internet Traffic Analyzer).*
Weihaw Chuang et al., Local–Area path diversity in the internet, University of Caifornia San Diego.*
f5 network SEE.IT specification sheet.*
Carey Williamson, Internet Traffic Measurement, Nov. 24, 2001, University Of Calgary, pp. 1–9.*

* cited by examiner

Primary Examiner—Marc S. Hoff
Assistant Examiner—Mohamed Charioui
(74) Attorney, Agent, or Firm—Finnegan, Henderson, Farabow, Garrett & Dunner, L.L.P.

(57) ABSTRACT

Methods, systems, and articles of manufacture of the present invention may assist in planning, execution, and evaluation of advertising campaigns on the Internet. Particularly, methods, systems, and articles of manufacture of the present invention may help evaluate and/or predict traffic volume on the Internet. An exemplary method for predicting traffic may comprise receiving historical traffic data for a location, and computing a prediction of traffic volume for a particular time at the location based on a linear relationship in the historical traffic data.

23 Claims, 6 Drawing Sheets

TRAFFIC ESTIMATION

BACKGROUND

1. Technical Field

The present invention generally relates to predicting traffic volume on the Internet, and more specifically to predicting traffic volume to assist in marketing, planning, execution, and evaluation of advertising campaigns for the Internet.

2. Related Art

The number of users on the Internet continues to grow at an astounding rate while businesses continue to rapidly commercialize its use. As they surf through websites, users generate a high volume of traffic over the Internet. Increasingly, businesses take advantage of this traffic by advertising their products or services on the Internet. These advertisements may appear in the form of leased advertising space on websites, which are similar to rented billboard space in highways and cities or commercials broadcasted during television/radio programs. Experience has shown that it can be difficult to plan, execute, and/or evaluate an advertising campaign conducted over the Internet. Unlike billboards and commercials, there are very few tools (e.g., Nielson ratings, etc.) to accurately measure or predict user traffic on the Internet.

One method for measuring exposure of advertisements posted on a website may be based on daily traffic estimates. This method allows one to control the exposure of an ad and predict the traffic volume (i.e., number of impressions, viewers, actions, website hits, mouse clicks, etc.) on a given site at daily intervals. However, there is no control over how this exposure occurs within the day itself because the method assumes a constant rate of traffic throughout the day. Experience has shown that website traffic typically exhibits strong hourly patterns. Traffic may accelerate at peak-hours, and hence, so does ad exposure. Conversely, at low traffic times, ads may be viewed at a lower rate. These daily (as opposed to hourly) estimates exhibit high intra-day errors, which result in irregular or uneven ad campaigns that are not always favored by advertisers.

This situation is illustrated in FIG. 1, where a pattern of under-over-under estimation is evident. Traffic volume in the hours of 12:00 am to 5:00 am, 6:00 am to 2:00 pm, and 3:00 pm to 11:00 pm are overestimated, underestimated, and overestimated, respectively. FIG. 2 shows error size for each hour relative to the traffic volume for the entire day. Note that errors tend to average out during the day. However, during times of high relative error, ad campaigns based on a daily traffic estimate tend to accelerate; while at times of low (negative) relative error, these same ad campaigns tend to dramatically decelerate. This situation yields an uneven campaign with "run-away" periods followed by "stalled" periods of exposure.

Campaign unevenness is a symptom of prediction errors (positive or negative). As illustrated in FIG. 2, taking the values of these hourly errors relative to a day's total traffic can give a good indication of the gravity of the campaign's failure to predict intra-day traffic patterns. By summing the absolute value of these relative hourly errors, it is clear that the hourly prediction errors can be significant. For instance, FIG. 2 shows a site with a very accurate daily estimate, but it has a 48.32% error relative to daily traffic when prediction error is accounted for on an hourly basis. A single hour's prediction error as a percentage of that hour's actual traffic can be much more dramatic. For instance, the hour starting at 9:00 am has a predicted traffic volume of 156,604, but the actual traffic volume is only 15,583, which is an error of 905% for that hour. Similarly for the hours of 1:00 am to 4:00 am, underestimation (per hour) ranges between 40 and 50 percent relative to the actual traffic volume for each respective hour.

Because of the dynamic nature of the Internet, it is difficult to predict the amount of time it will take before advertising goals for a particular advertisement are met. Therefore, it would be beneficial to provide a mechanism to better estimate traffic volume.

SUMMARY OF EXEMPLARY EMBODIMENTS

Methods, systems, and articles of manufacture of the present invention may assist in planning, execution, and evaluation of advertising campaigns on the Internet. Particularly, methods, systems, and articles of manufacture of the present invention may help evaluate and/or predict traffic volume on the Internet.

One exemplary embodiment of the invention relates to a method for predicting traffic. The method may comprise receiving historical traffic data for a location, and computing a prediction of traffic volume for a particular time at the location based on a linear relationship in the historical traffic data.

Additional embodiments and aspects of the invention are set forth in the detailed description which follows, and in part are obvious from the description, or may be learned by practice of methods, systems, and articles of manufacture consistent with the present invention. It is understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference is now made in detail to exemplary embodiments of the invention, examples of which are illustrated in the accompanying drawings. Wherever possible, the same reference numbers are used throughout the drawings to refer to the same or like parts.

As discussed above, one method for predicting traffic may estimate a daily traffic volume for a location and use the estimate to compute a constant traffic rate throughout the day. However, other methods (e.g., first-order approximations, $N^{th}$ order approximations, etc.) described below, may also be used to compute traffic predictions using different time intervals, such as hourly predictions. Further, these methods may use intra-day relationships in hourly traffic patterns to more accurately predict traffic volume at the location.

Figure 1:
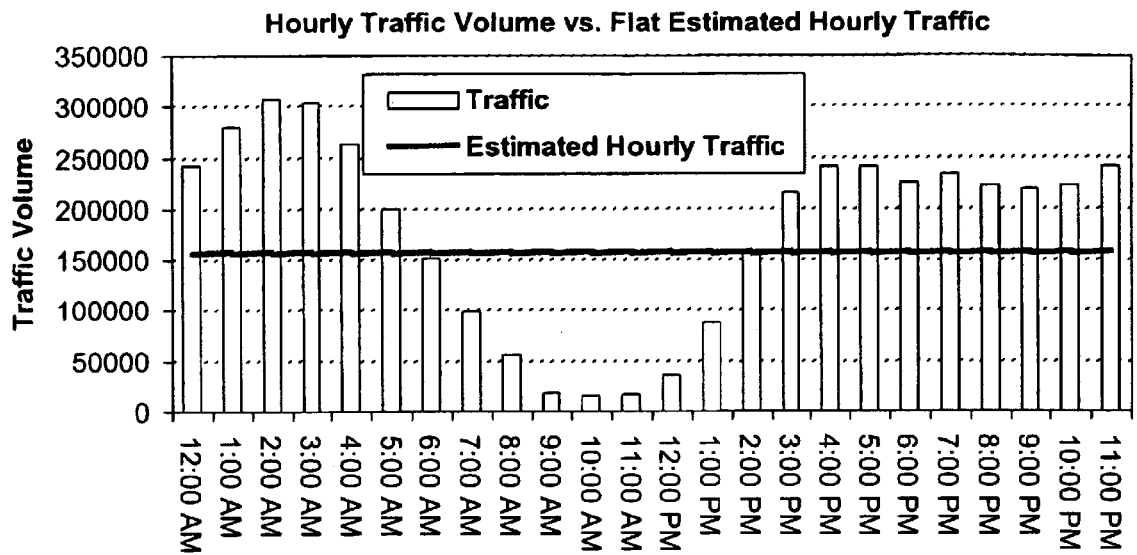
FIG. 1 illustrates an exemplary pattern of under-over-under estimation consistent with the prior art.
Figure 2:
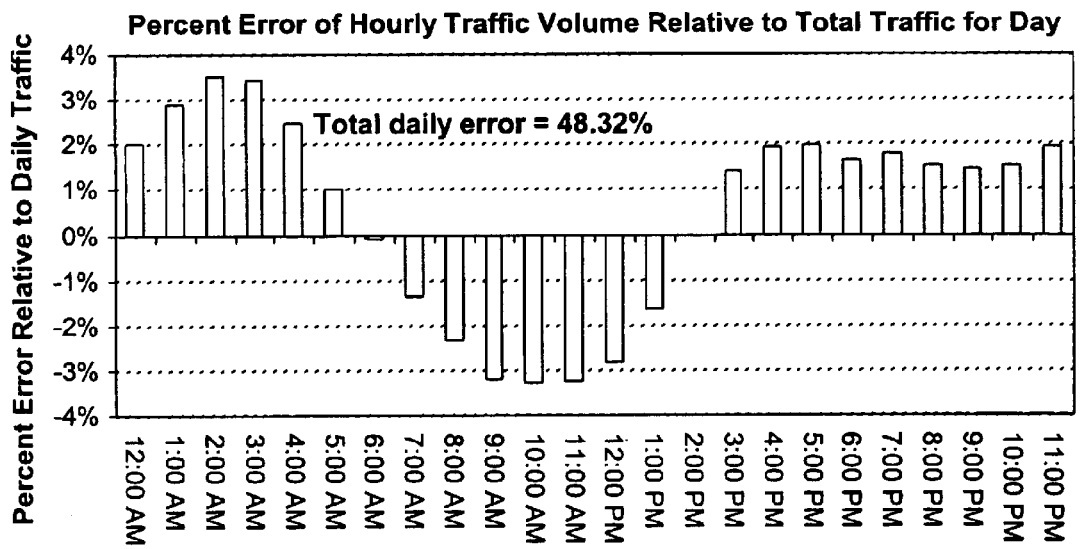
FIG. 2 illustrates exemplary errors in the pattern relative to a day's total traffic consistent with the prior art.
Figure 3A:
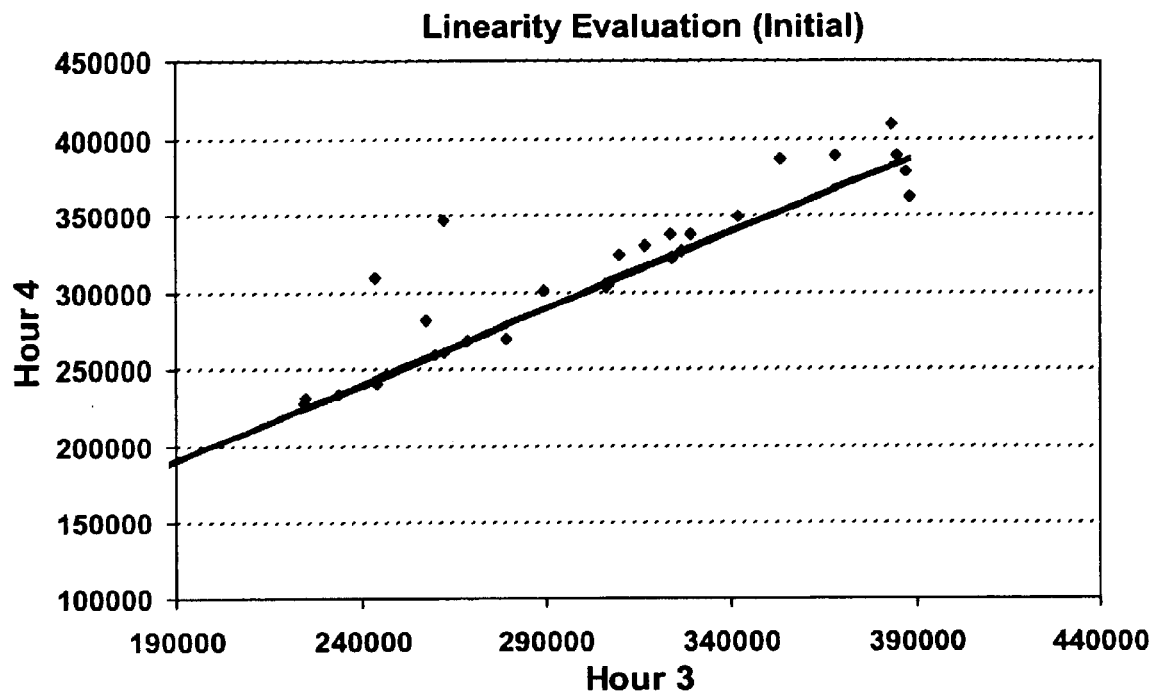
FIGS. 3A and 3B illustrate exemplary linear relationships in hourly traffic consistent with features and principles of the present invention.
Figure 3B:
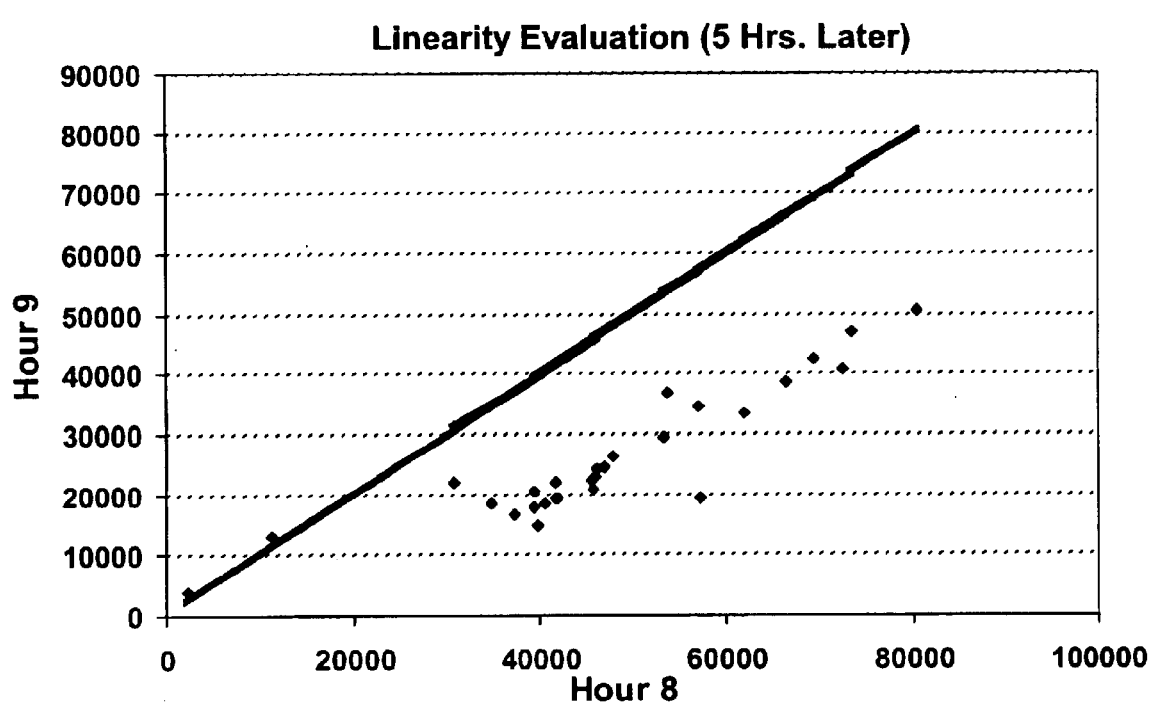

According to features and principles of the present invention, an exemplary method for predicting traffic may assume a linear relationship exists between an hour k of a day i and a next hour k+1 of day i. FIG. 3A shows an example of the linear relationship. It plots the measured traffic volume at the third hour versus the fourth hour of each day in February, 2001 at a test location. The plot shows the measured traffic volumes of the third and fourth hour form a linear pattern. This pattern may be found at most locations, but the strength and form of the linear relationship varies by hour and across locations. For example, FIG. 3B shows a similar relationship five hours later at the same location for the eighth and ninth hours, but while the relationship is still fairly linear, it significantly differs in slope (the solid line represents a 45-degree line in both FIGS. 3A and 3B).

In general, for most locations, the relationship between traffic at subsequent hours is linear enough to justify using a first-order approximation of an hourly traffic pattern, although higher $N^{th}$ order approximations (which may be more accurate) may also be used. As one of ordinary skill in the art can appreciate, some exemplary approximations may employ linear regression, polynomial fitting, Markov chain models, and other mathematical models.

In general, a first-order approximation may provide consistently accurate traffic volume predictions, but when the measured traffic volume contains structural traffic changes (e.g., outlying data), the method may "blow up" (i.e., yield extraordinarily large predictions). The traffic volume predictions may be filtered to prevent the blow ups using mathematical functions, distributions, or other criteria. For example, one embodiment of the present invention may construct a test statistic filter $$f(\hat{x}_{i,k}),$$

such that $$f(\hat{x}_{i,k}) = \begin{cases} 1; & \text{if } \overline{x}_k - t_c \hat{\sigma}_k \leq \hat{x}_{i,k} \leq \overline{x}_k + t_c \hat{\sigma}_k \\ 0; & \text{otherwise} \end{cases}$$

where $\hat{x}_{i,k}$ is a predicted traffic volume for hour k at day i, $t_c$ is a threshold estimate, $\overline{x}_k$ is an estimated mean of the measured traffic volume at hour k over n days given by $$\overline{x}_k = \frac{1}{n}\sum_{i=1}^{n} x_{i,k}$$

and $\hat{\sigma}_k$ is an estimated standard deviation of the measured traffic volume at hour k over n days given by $$\hat{\sigma}_k = \sqrt{\frac{1}{n-1}\left(\sum_{i=1}^{n}(x_{i,k}^2) - n\overline{x}_k\right)}$$

Table 2 shows the exemplary critical values of $t_c$ corresponding to the number of days n that may be used to compute the predicted traffic volume $\hat{x}_{i,k}$.

The $t_c$ values in Table 2 are based on a student-t distribution cumulative density function (c.d.f.) with a 99% cumulative probability criterion, but as one of ordinary skill in the art can appreciate, the values of $t_c$ may be based on any other statistical/mathematical function (e.g., discrete function, continuous function, Poisson c.d.f., binomial c.d.f., etc.) with any other criterion.

TABLE 2

Critical values of $t_c$

| n | $t_c$ |
|---|---|
| <20 | 2.878 |
| 21 | 2.861 |
| 22 | 2.845 |
| 23 | 2.831 |
| 24 | 2.819 |
| 25 | 2.807 |
| 26 | 2.797 |
| 27 | 2.787 |
| 28 | 2.779 |
| 29 | 2.771 |
| 30 | 2.763 |
| 31 | 2.756 |
| 32 | 2.750 |
| 33 to 42 | 2.704 |
| 43 to 62 | 2.660 |
| 63 to 122 | 2.617 |
| >122 | 2.576 |

One exemplary embodiment of the present invention may use filter $$f(\hat{x}_{i,k})$$

to measure whether $\hat{x}_{i,k}$ is believable based on historical traffic data. A problem with this is that if a permanent regime or behavioral change occurs in a traffic pattern, then past traffic data may become irrelevant. In spite of this, filter $$f(\hat{x}_{i,k})$$

may be used to indicate whether a location's traffic pattern is stable enough for a first-order approximation to be effective. If this is not the case, then when $$f(\hat{x}_{i,k})$$

is zero, one embodiment may revert to another model that may not blow up in the face of pattern changes.

When modeling a traffic pattern based on historical traffic data, the standard deviation $\hat{\sigma}_k$ may be useful if the historical traffic data contains extreme traffic volume values or outlying data, as defined below. It is not unusual to encounter extreme values coming from errors or by omission in historical traffic data. For instance, a chain of missing values in the historical traffic data at times where traffic is typically high for a certain location may indicate that there has been some historical data capture problem. Of course, it may also mean that the location became unpopular and that traffic for those times was indeed zero. This type of atypical data is referred to as outlying data. The criteria for deciding between what is legitimate data and what is outlying data is rather subjective. However, traffic volume prediction may be improved if these extreme values are removed or corrected.

In one exemplary embodiment of the present invention, a filter may be used to correct or remove outlying data from the historical data. The filter may employ a criteria that assumes a measured traffic volume at some time (e.g., at day i and at hour k) in the historical data is outlying data when the measured traffic volume at that time lies more than $N_d$ standard deviations from the mean $\bar{x}_k$ of the measured traffic volume at hour k over a history of n days. If the measured traffic volume is outlying, then the filter may replace the outlying data with the mean $\bar{x}_k$. The predicted traffic volume may then be calculated using the corrected data.

Table 3 uses various exemplary predictability scores to compare the performance of a daily mean and an hourly $N^{th}$ order approximation method in predicting traffic volume at a test location for a period from Feb. 1, 2001 to Feb. 28, 2001.

TABLE 3

Location A from Feb 1, 2001 to Feb 28, 2001
Total traffic = 92,407,331 impressions
(total traffic volume)

|  | Daily Mean | Hourly Prediction |
|---|---|---|
| Mean Error | 3,396 | (347) |
| Standard Dev. | 89,496 | 16,262 |
| Maximum Error | 239,809 | 144,192 |
| Minimum Error | 26 | 4 |
| Normalized L1 Score | 47% | 6% |

The predictions were computed using a 90-day sliding window of historical traffic data (i.e., when calculating the prediction for each hour of the day, only the most recent 90 days of traffic data were used). The comparison is made in terms of hourly prediction errors, where each method observed (i.e., recorded in the historical traffic data) the traffic volume for the last 90 days up to hour k of day i and computed a prediction $\hat{x}_{i,k+1}$ for the next hour's traffic based on the observation. Each method continued predicting the traffic volume for the subsequent hour as the previous hour of traffic volume was observed. Then, from the prediction and the measured traffic volumes, the prediction errors $e_{i,k}$ were computed, as defined by $$e_{i,k} = X_{i,k} - \hat{x}_{i,k}$$

The predictability scores in Table 3 were calculated using $$\bar{e} = \frac{1}{24n} \sum_{i=1}^{n} \sum_{k=0}^{23} e_{i,k} \text{ (mean error)},$$

$$\sigma_e = \frac{1}{24n-1} \sum_{i=1}^{n} \sum_{k=0}^{23} (e_{i,k}^2 - 24 n\bar{e}^2) \text{ (standard deviation)},$$

$$e_{max} = \max_{(i,k)} |e_{i,k}| \text{ (maximum error)},$$

$$e_{min} = \min_{(i,k)} |e_{i,k}| \text{ (minimum error), and}$$

$$L1 = \frac{\sum_{i=1}^{n} \sum_{k=0}^{23} |e_{i,k}|}{\sum_{i=1}^{n} \sum_{k=0}^{23} x_{i,k}} \times 100\% \text{ (normalized } L1 \text{ score)}$$

Although the above lists the mean error, standard deviation, maximum error, minimum error, and normalized L1 score as possible predictability scores, other metrics (e.g., total traffic, etc.) may be used as a predictability score. From Table 3, we can see that the hourly $N^{th}$ order approximation method performed better than the daily mean method.

Predictability scores may provide a good criterion for selecting a method (e.g., daily mean versus hourly estimation) of predicting traffic based on a desired smoothness in deployment of an ad campaign. A smoothly deployed ad campaign exposes users to advertisements at a predictable pace. Hence, a smooth ad campaign may use a method that accurately predicts traffic volume. In contrast, an unsmooth ad campaign exposes users to advertisements unpredictably or even haphazardly until the exposure reaches a predetermined level (i.e., a traffic volume level) that signifies the end of the campaign.

Any given predictability score may give a measure of the size of a method's prediction error for an analyzed time period. That is, it may give a measure of a location's traffic predictability and may be used to compare the predictability of different locations. This is an important criterion when seeking smooth campaigns because it provides a comparison metric across different locations. The predictability score may be used for campaign decision-making. Campaigns with a high smoothness priority may deliver ads at locations based on the knowledge that the locations with a better predictability score may be more predictable and are likely to deliver smoother campaigns. Note that a first location's predictability score may be better than a second location's predictability score if the first score is lower or higher than the second score.

For example, consider the normalized L1 score in Table 4 for a second location B during the month of February. Compared with the performance results in Table 3, the location for Table 4 may be deemed less predictable because its normalized L1 score using the point-slope model is 12%, which is higher than the score (6%) for Table 3's location. However, the second location has less total traffic (i.e., 8,962,345 impressions) than the first location (i.e., 92,407,331 impressions). In general, lower traffic locations may be less predictable, so a predictability score based on total traffic would be better if the total traffic is higher.

TABLE 4

Location B from Feb 1, 2001 to Feb 28, 2001
Total traffic = 8,962,345 impressions
(total traffic volume)

|  | Daily Mean | Hourly Prediction |
|---|---|---|
| Mean Error | (1,003) | 344 |
| Standard Dev. | 5,851 | 2,263 |
| Maximum Error | 15,482 | 8,578 |
| Minimum Error | 1 | 6 |
| Normalized L1 Score | 32% | 12% |

Figure 4:
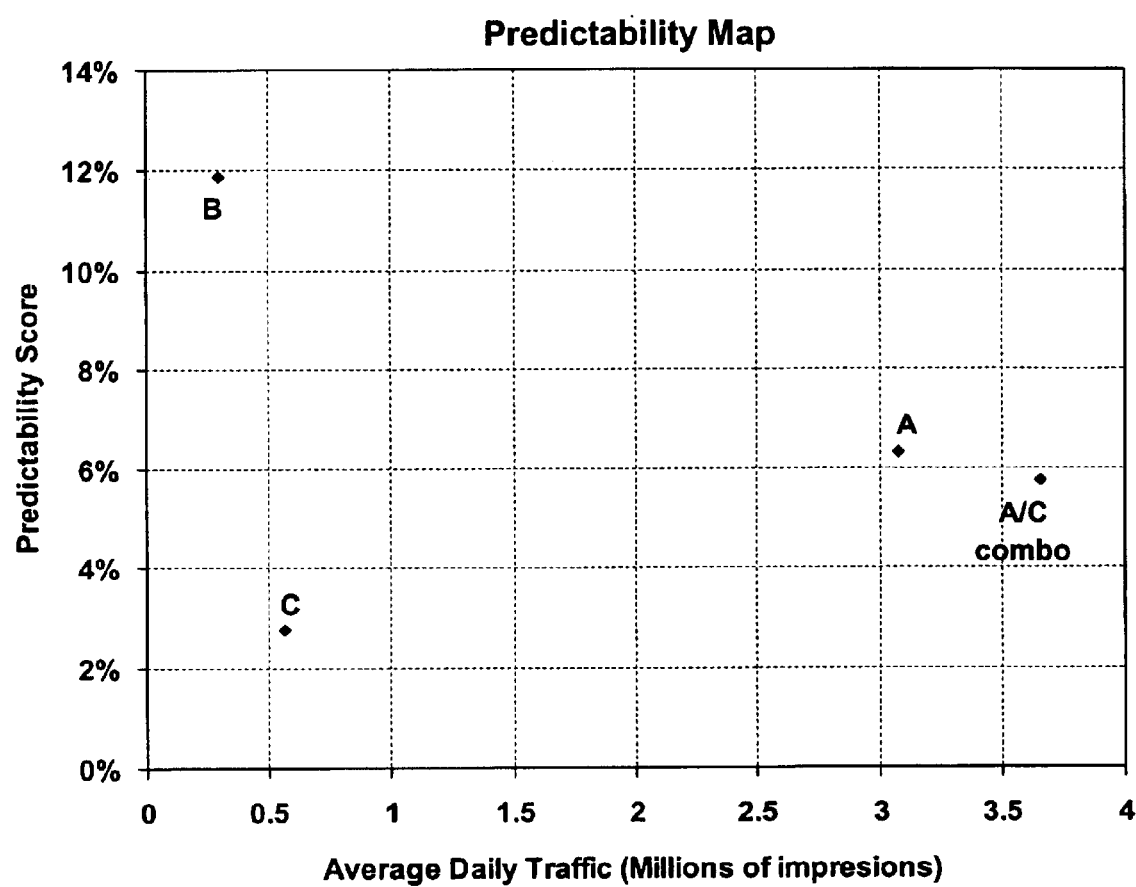
FIG. 4 illustrates an exemplary predictability map consistent with features and principles of the present invention.

It may be better to direct smoothness-sensitive campaigns towards locations with a better predictability score. Generalizing this idea, we can form a predictability map that compares how safe (in terms of smoothness) a location is relative to other locations. FIG. 4 illustrates an exemplary predictability map consistent with features and principles of the present invention. The map plots a predictability score, such as the L1 score, against the average daily traffic volume for three test locations. Although the predictability map in FIG. 4 is a scatter plot, one of ordinary skill in the art can appreciate that the predictability map may take the form of a contour plot, bar graph, line graph, or any other type of graph. From the map, location C appears to be a better target for a smoothness-sensitive campaign than location B because of its lower L1 score. However, we may target a group of locations for an ad campaign. The predictability score $PR_G$ of the group of locations may then be calculated using $$PR_G = \frac{\sum_{j \in G} T_j PR_j}{\sum_{j \in G} T_j}$$

where G is a set of all locations j in the group, $T_j$ is location j's total traffic per unit of time (i.e., day), and $PR_j$ is the predictability score of location j.

For example, using the map in FIG. 4, we can advertise an ad at both locations A and C to fulfill an ad campaign with less expected prediction error than if we only advertised at location A. Further, we do not need to target a campaign equally towards each location in the group. We can use any convex combination of locations in order to meet both desired traffic volume and predictability requirements.

In one exemplary embodiment, the hourly traffic prediction methods described above may be used to predict the traffic volume for a location (e.g., a website) over a period of time comprising $m_z$ hours. An hourly prediction in the time period may be used to predict a next hour's traffic volume, and this may be done recursively to predict traffic volumes for hours that are further into the future. For example, if $H_z$ is a set of hours k+m, then the predicted traffic volume for a location during the $H_z$ hours may be calculated by $$\hat{d} = \sum_{k+m \in H_z} \hat{x}_{i,k+m}$$

which is simply the sum of the individual hourly traffic volume predictions for the time defined by $H_z$.

Figure 5:
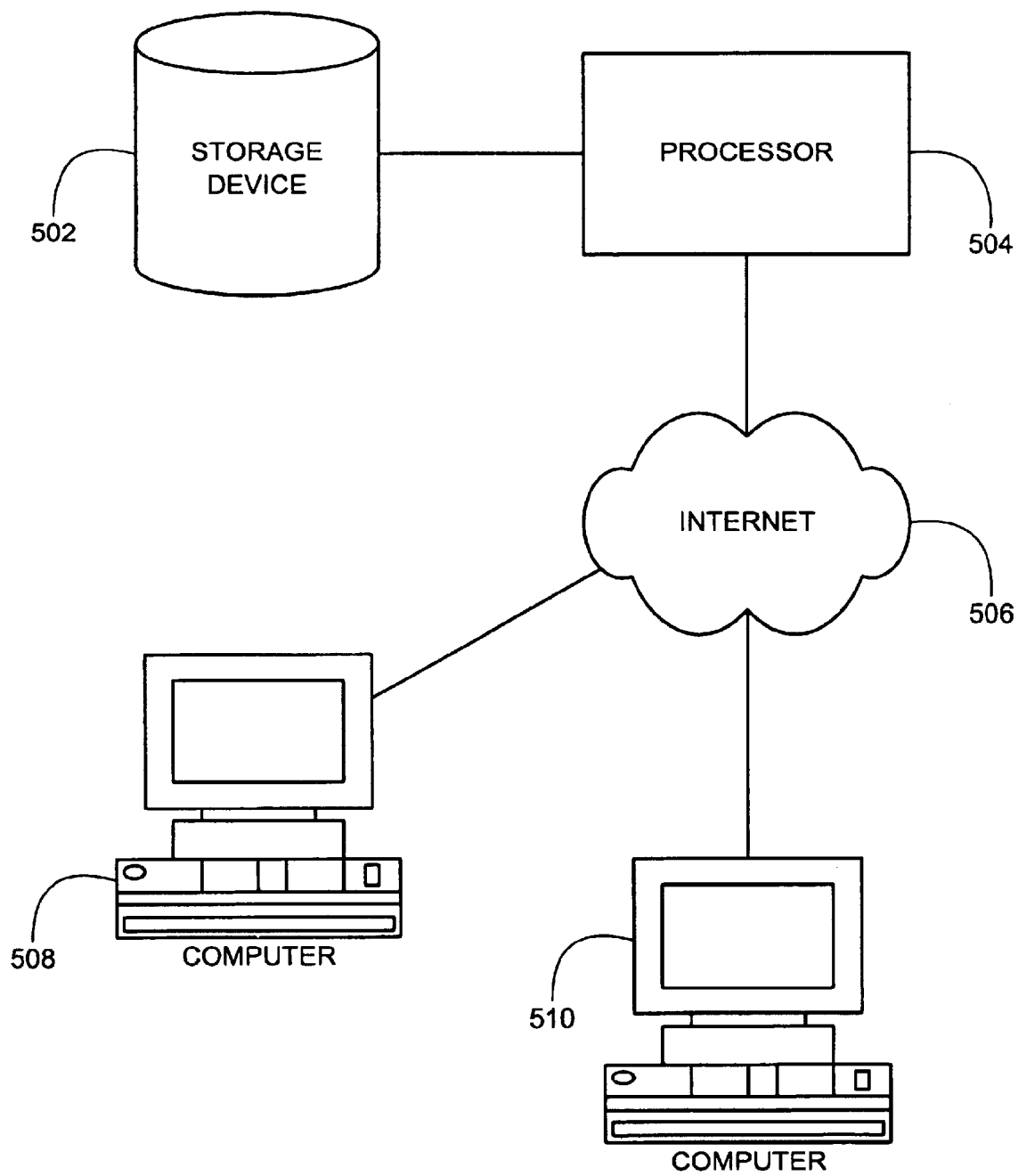
FIG. 5 illustrates an exemplary system for predicting traffic consistent with features and principles of the present invention.

According to features and principles of the present invention and as illustrated in FIG. 5, an exemplary system 500 for predicting traffic may include a storage device 502, a processor 504, a network 506, a computer 508, and a computer 510. Processor 504 may be coupled to storage device 502 and network 506. Network 506 may be coupled to computers 508 and 510. Storage device 502 may be implemented using hard drives, floppy disks, ROM, RAM, and/or any other mechanisms for saving data. Processor 504 may be implemented using computers, application-specific integrated circuits, CPUS, and/or any other device that is capable of following instructions and/or manipulating data. Network 506 may be implemented via the Internet, wide area networks, local area networks, telephone networks, and/or any other mechanism that can facilitate remote communications. Computers 508 and 510 may be personal computers, desktops, mainframes, and/or any other computing device.

Figure 6:
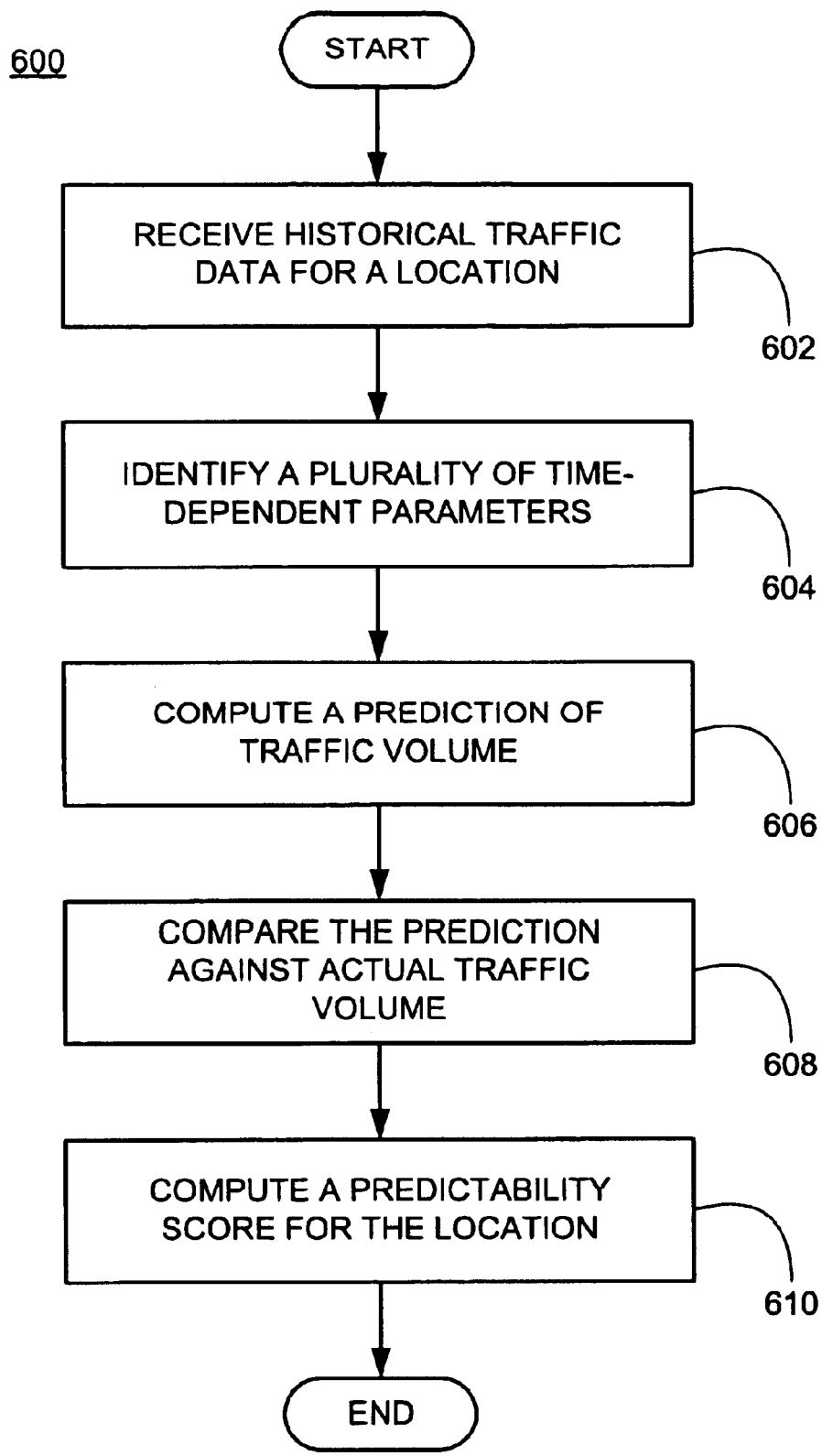
FIG. 6 illustrates an exemplary method for predicting traffic consistent with features and principles of the present invention.

According to features and principles of the present invention, system 500 may be configured to implement exemplary method 600, illustrated in FIG. 6, for predicting traffic. Processor 504 may receive historical traffic data for a location (step 602). The historical traffic data may be stored on storage device 502. Historical traffic data may include any information about previous traffic volume at the location. If the location is a website on network 506, the historical traffic data may include a number of visitors to the website via computers 508 or 510, a number of hits at the website, a number of impressions at the website, and/or any other data about the website for various times of the day.

Particularly, the historical traffic data may include observations of the traffic volume $x_{i,k}$ at the website at each hour k of day i for any number of days. The observations may be made by processor 504, counters at the website, or any other mechanism. Besides websites, the location may be any other place where traffic passes through or attendance can be measured and/or observed. For example, a location may be a highway, a street, a television channel, a radio station, or any other place where traffic information is obtainable.

Processor 504 may compute a traffic volume prediction (step 606), consistent with features and principles of the present invention. The prediction may be computed using any of the methods discussed herein and it may be the predicted traffic volume for the next hour, day, time niche, or other time period. Processor 504 may then compare the prediction against actual measured traffic volume data (step 608). The actual traffic volume data may reflect visits, hits, etc. by users at a location (e.g., website) via computers 508 or 510. In one embodiment, processor 504 may make the comparison by calculating $e_{i,k}$.

Consistent with features and principles of the present invention, processor 504 may then compute a predictability score for the location (step 610). The predictability score may be a normalized L1 score, a mean error, a maximum error, a minimum error, or any other metric. When $e_{i,k}$ is calculated, the computed predictability score may also be based on $e_{i,k}$.

Figure 7:
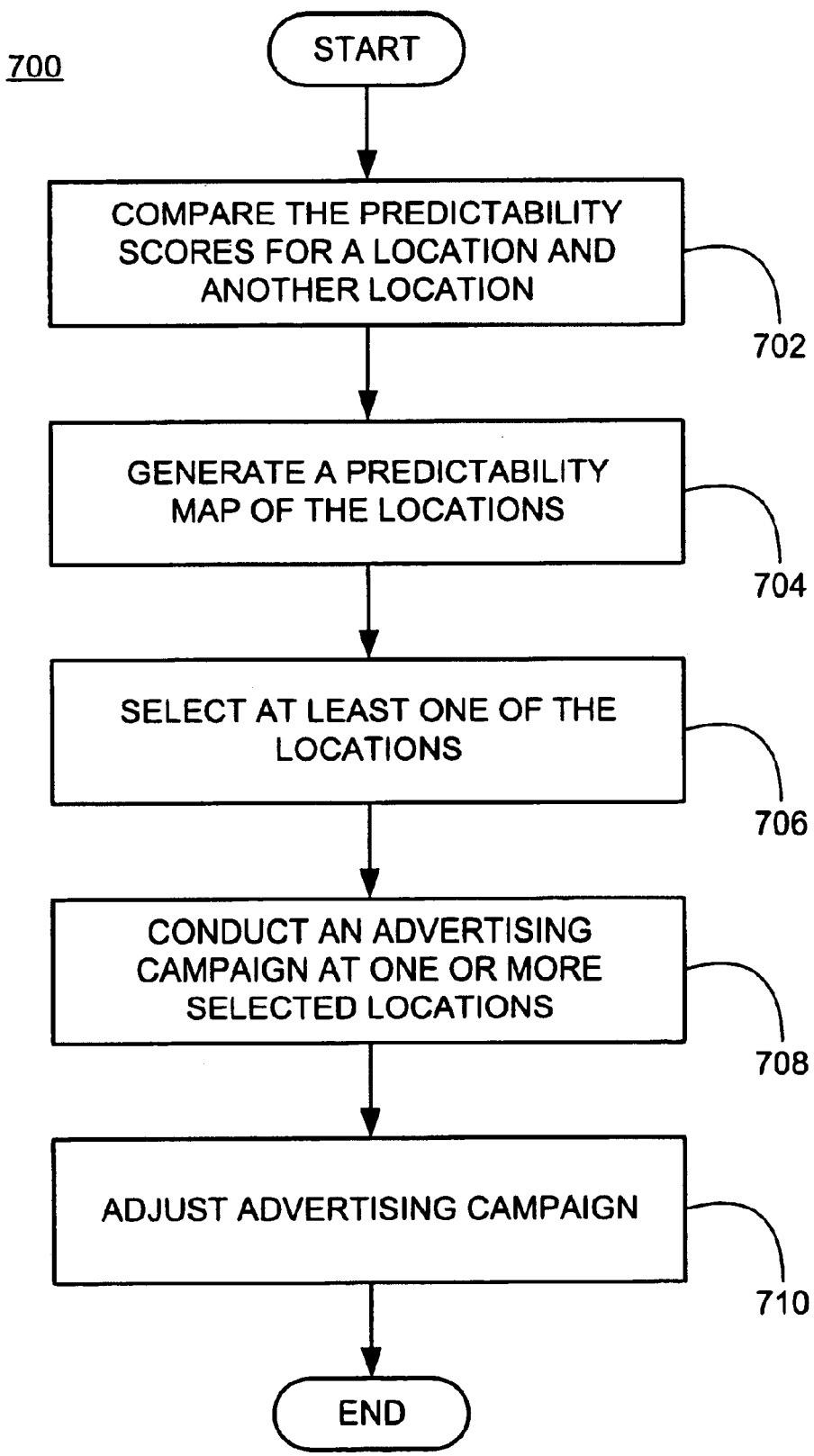
FIG. 7 illustrates an exemplary method for conducting an ad campaign consistent with features and principles of the present invention.

Additionally, processor 504 may perform steps 602 to 610 to compute a predictability score of another location. System 500 may execute an ad campaign based on the predictability scores of the two locations using an exemplary method 700 illustrated in FIG. 7. For example, processor 504 may compare the predictability scores of the two locations (step 702) and generate a predictability map (step 704). From the predictability map and/or the predictability scores, processor 504 may select one of the two locations, a group comprising the two locations, and/or a larger plurality of locations for an advertising campaign (step 706). Processor 504 may conduct an advertising campaign at the selected location(s) by sending or placing advertisements at the locations (step 708). If the locations are websites, then processor 604 may display advertisements on the websites.

According to features and principles of the present invention, during the life of the ad campaign, processor 504 may adjust an advertising schedule of the ad campaign (step 710) to compensate for differences or variances between predicted and actual traffic. The advertising schedule may include the planned times and locations where processor 504 intends to place ads, as determined in steps 702 to 706. As an ad campaign progresses, processor 504 may predict the traffic volume at various locations for a window of W days (e.g., processor 504 may predict the traffic volume for multiple hours at a website, as previously discussed). Processor 504 may then use the predictions to adjust the advertisement delivery schedule within the time window.

In the foregoing description, various features are grouped together in various embodiments for purposes of streamlining the disclosure. This method of disclosure is not to be interpreted as reflecting an intention that the claimed invention requires more features than are expressly recited in each claim. Rather, as the following claims reflect, inventive aspects may lie in less than all features of a single foregoing disclosed embodiment. Thus, the following claims are hereby incorporated into this description, with each claim standing on its own as a separate embodiment of the invention. Furthermore, as used herein, the words "may" and "may be" are to be interpreted in an open-ended, non-restrictive manner.

What is claimed is:

1. A method for predicting traffic, comprising:
  receiving historical traffic data for a location;
  computing a prediction of traffic volume for a particular time at the location based on a linear relationship in the historical traffic data;
  observing traffic volume data from the location;
  comparing the computed prediction against the observed traffic volume data; and
  computing a predictability score for the location from the comparison.

2. The method of claim 1, further comprising:
  comparing the predictability score for the location with a predictability score of another location.

3. The method of claim 2, further comprising:
  generating a predictability map of the locations based on at least the comparison of the predictability scores for the locations.

4. The method of claim 2, further comprising:
  selecting at least one of the locations based on at least the comparison between the predictability scores; and
  conducting an advertising campaign at the selected one or more locations.

5. A system for predicting traffic, comprising:
  a processor,
  wherein the processor is configured to perform the method according to claim 1.

6. A recording medium readable by a processor, wherein the recording medium contains instructions to configure the processor to perform the method according to claim 1.

7. A method for predicting traffic, comprising:
  receiving historical traffic data for a location;
  identifying outlying data in the historical traffic data that does not meet at least one predetermined parameter;
  substituting different data for the outlying data; and
  computing a prediction of traffic volume for a particular time at the location based on a linear relationship in the historical traffic data.

8. The method of claim 7, wherein the predetermined parameter includes an estimate of a standard deviation of the historical traffic data.

9. The method of claim 7, wherein substituting different data comprises:
  computing the different data such that the different data meets the at least one predetermined parameter.

10. A system for predicting traffic, comprising:
  a processor,
  wherein the processor is configured to perform the method according to claim 7.

11. A recording medium readable by a processor, wherein the recording medium contains instructions to configure the processor to perform the method according to claim 7.

12. A method for predicting traffic, comprising:
  receiving historical traffic data for a location, wherein the historical traffic data comprises historical hourly traffic data; and
  computing a prediction of hourly traffic volume for a particular hour at the location based on a linear relationship in the historical traffic data, using at least the historical hourly traffic data from the same particular hour over a plurality of days.

13. A system for predicting traffic, comprising:
  a processor,
  wherein the processor is configured to perform the method according to claim 12.

14. A recording medium readable by a processor, wherein the recording medium contains instructions to configure the processor to perform the method according to claim 12.

15. A method for predicting traffic, comprising:
  receiving historical traffic data for a location;
  identifying outlying data in the historical traffic data that does not meet at least one predetermined parameter;
  removing the outlying data from the historical traffic data; and
  computing a prediction of traffic volume for a particular time at the location based on a linear relationship in the historical traffic data,
  wherein the predetermined parameter includes an estimate of a standard deviation of the historical traffic data.

16. A system for predicting traffic, comprising:
  a processor,
  wherein the processor is configured to perform the method according to claim 15.

17. A recording medium readable by a processor, wherein the recording medium contains instructions to configure the processor to perform the method according to claim 15.

18. A method for predicting traffic, comprising:
  receiving historical traffic data for a location;
  filtering the historical traffic data using at least one of a threshold level and a mathematical distribution; and
  computing a prediction of traffic volume for a particular time at the location based on a linear relationship in the historical traffic data.

19. A system for predicting traffic, comprising:
  a processor,
  wherein the processor is configured to perform the method according to claim 18.

20. A recording medium readable by a processor, wherein the recording medium contains instructions to configure the processor to perform the method according to claim 18.

21. A method for predicting traffic, comprising:
  receiving historical traffic data for a location;
  computing a prediction of traffic volume for a particular time at the location based on a linear relationship in the historical traffic data; and
  filtering the prediction of traffic volume.

22. A system for predicting traffic, comprising:
  a processor,
  wherein the processor is configured to perform the method according to claim 21.

23. A recording medium readable by a processor, wherein the recording medium contains instructions to configure the processor to perform the method according to claim 21.

* * * * *